United States Patent [19]

Cole et al.

[11] Patent Number: 5,241,680
[45] Date of Patent: Aug. 31, 1993

[54] LOW-POWER, STANDBY MODE COMPUTER

[75] Inventors: James F. Cole, Palo Alto; James H. McNamara, Santa Cruz, both of Calif.

[73] Assignee: Grid Systems Corporation, Fremont, Calif.

[21] Appl. No.: 958,983

[22] Filed: Oct. 9, 1992

Related U.S. Application Data

[60] Continuation of Ser. No. 710,611, Jun. 5, 1991, Pat. No. 5,163,153, which is a division of Ser. No. 414,203, Sep. 28, 1989, Pat. No. 5,041,964, which is a continuation-in-part of Ser. No. 365,147, Jun. 12, 1989, Pat. No. 5,133,076.

[51] Int. Cl.⁵ .............................................. G06F 1/30
[52] U.S. Cl. .................................. 395/750; 364/707; 364/DIG. 1; 364/231.2; 364/246.91; 364/273.1
[58] Field of Search ............... 395/750, 425; 364/707; 365/226, 228

[56] References Cited

U.S. PATENT DOCUMENTS

| | | | |
|---|---|---|---|
| 3,286,239 | 11/1966 | Thompson et al. | 371/66 |
| 4,005,395 | 1/1977 | Foster, Jr. et al. | 365/229 |
| 4,316,247 | 2/1982 | Iwamoto | 364/707 |
| 4,317,180 | 2/1982 | Lies | 395/750 |
| 4,317,181 | 2/1982 | Teza et al. | 395/550 |
| 4,409,665 | 10/1983 | Tubbs | 395/275 |
| 4,412,284 | 10/1983 | Kerforne et al. | 395/575 |
| 4,458,307 | 7/1984 | McAnlis et al. | 395/575 |
| 4,698,748 | 10/1987 | Juzswik et al. | 395/750 |
| 4,710,903 | 12/1987 | Hereth et al. | 365/226 |
| 5,041,964 | 8/1991 | Cole et al. | 395/725 |

OTHER PUBLICATIONS

"Product Comparison," Infoworld, pp. 52-54, 83, 88, Jun. 3, 1989.
"82C100, 82C101," Chips Advance Information, Pub. No. 2-100-B pp. 1-72.

Primary Examiner—Debra A. Chun
Attorney, Agent, or Firm—Townsend and Townsend

[57] ABSTRACT

A method and apparatus for configuring a computer in a low-power mode are provided. In the low-power mode, dynamic random access memory is refreshed by a battery powered system in order to maintain the memory contents. Low-power mode is entered by saving an interrupt mask and by disabling interrupts, followed by saving the DMA status, finishing DMA operations, and disabling DMA. After these steps, the I/O state of the machine is saved by saving various I/O registers and ports. A refresh of the memory is forced before the system refresh operations are discontinued.

2 Claims, 14 Drawing Sheets

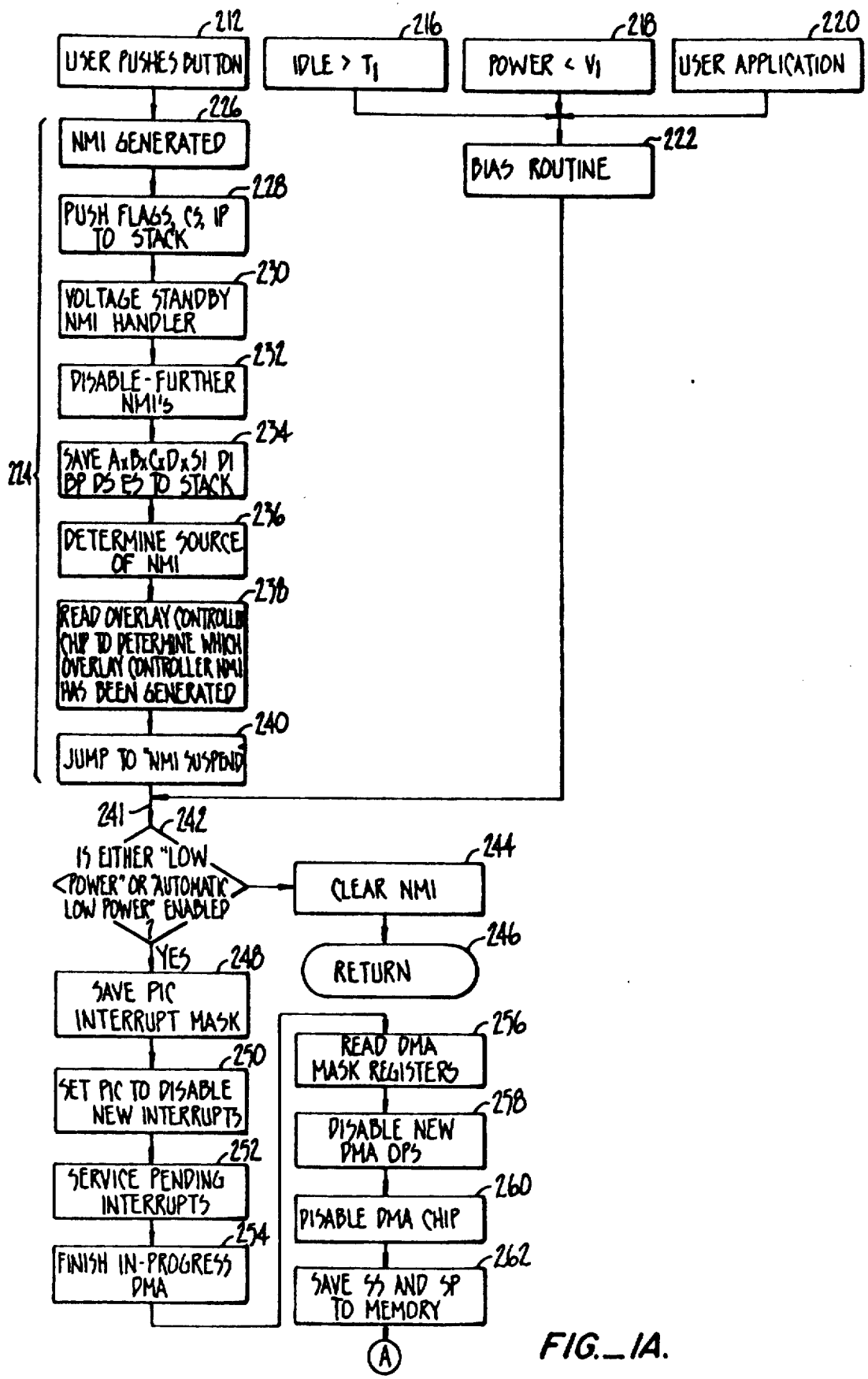
FIG._1A.

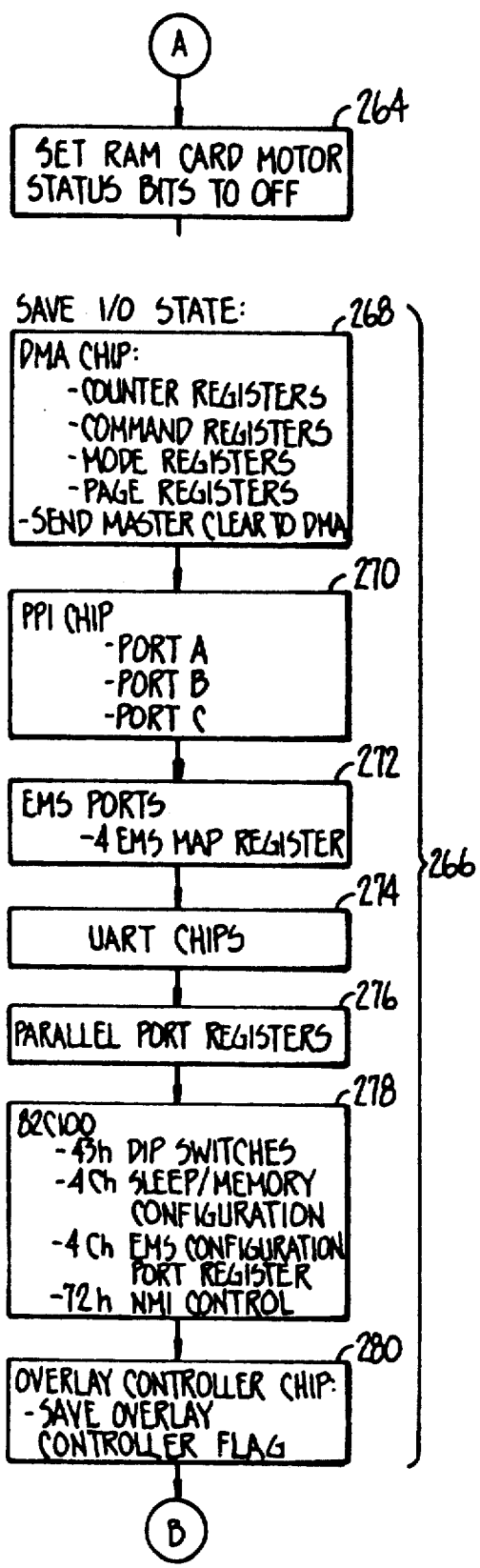
FIG._1B.
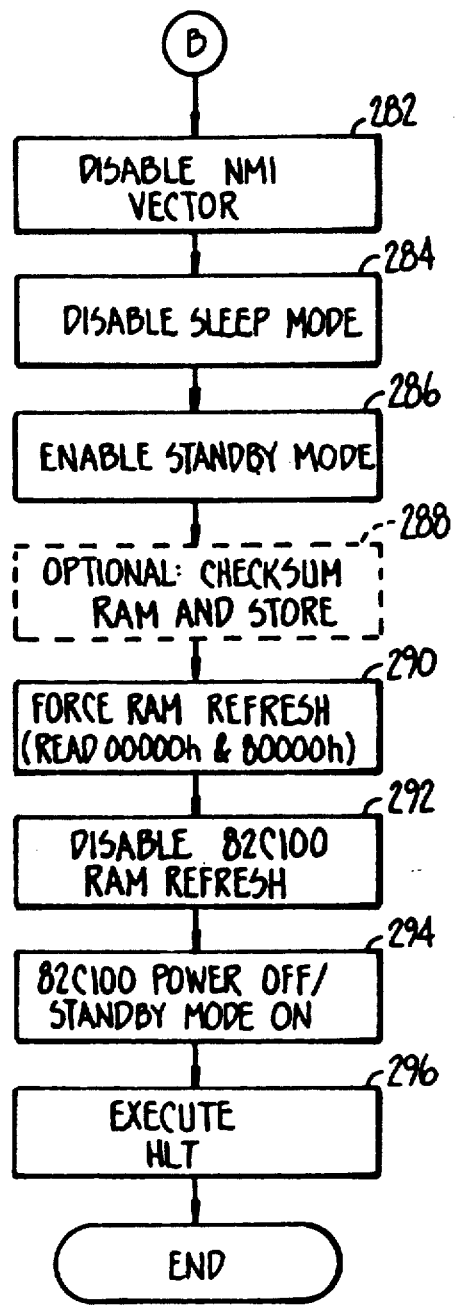
FIG._1C.

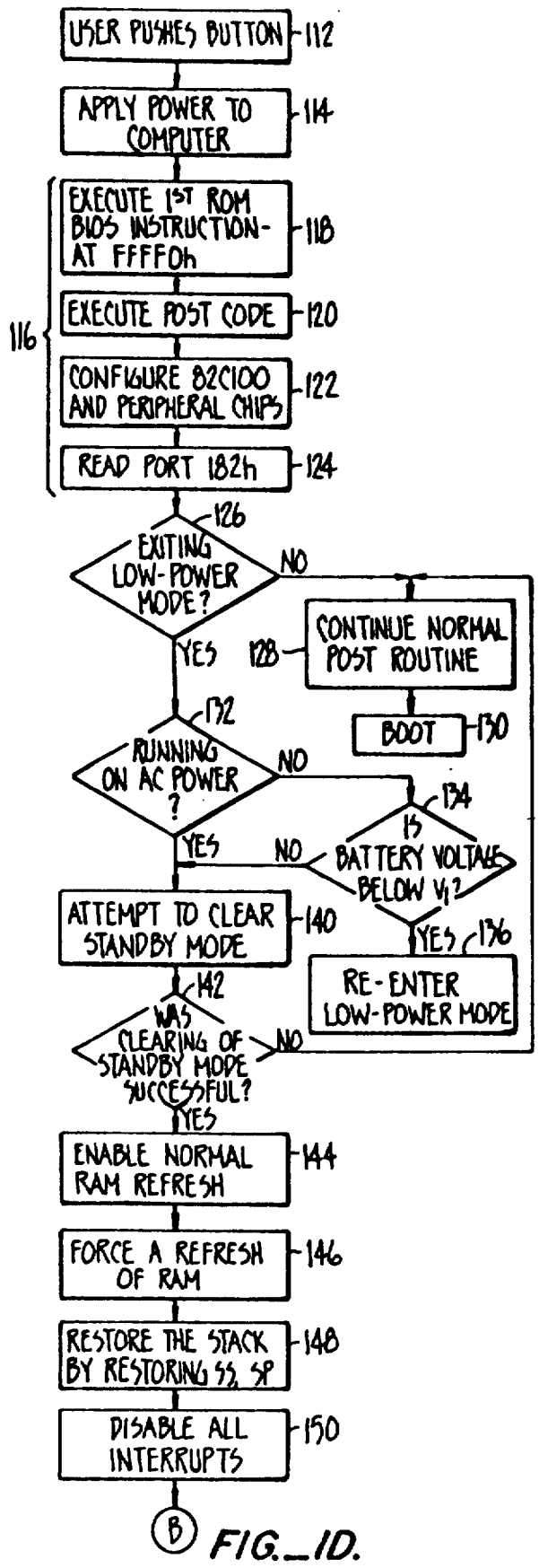
FIG._1D.
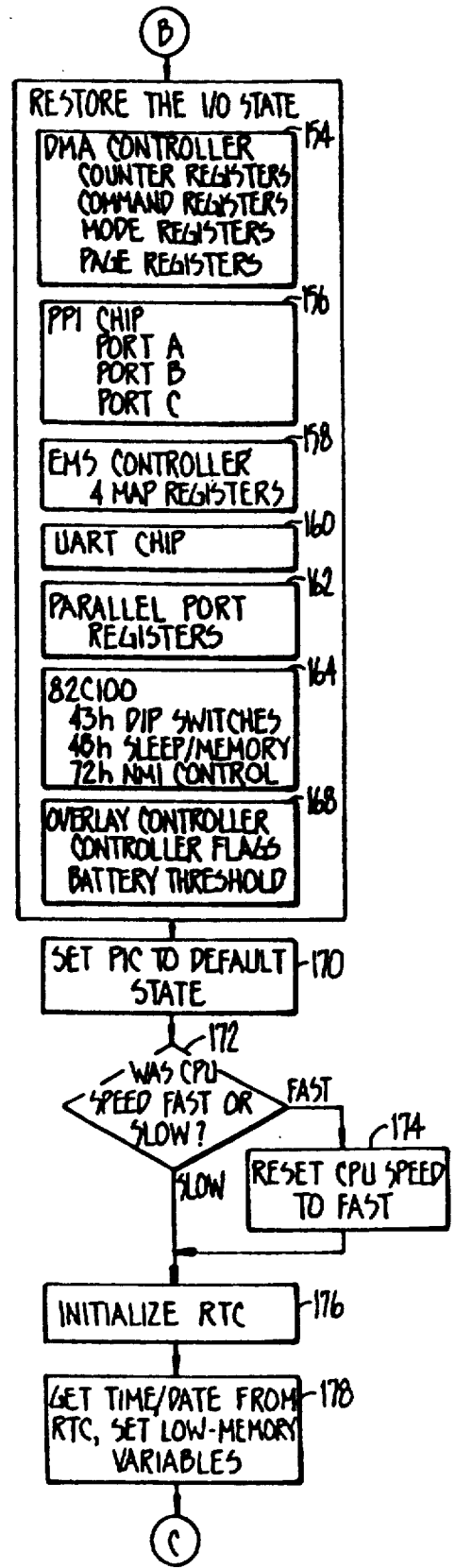
FIG._1E.

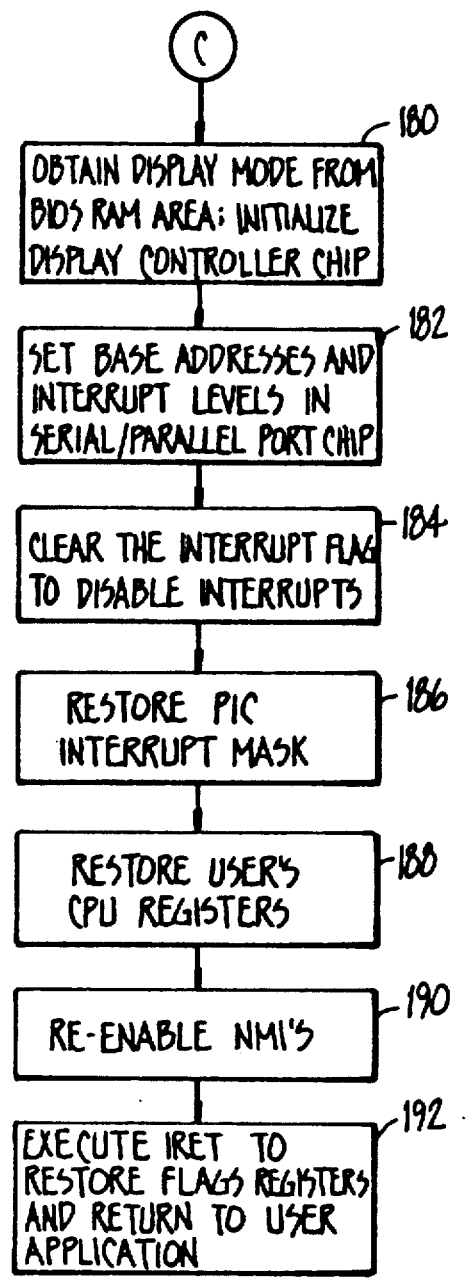
FIG._1F.

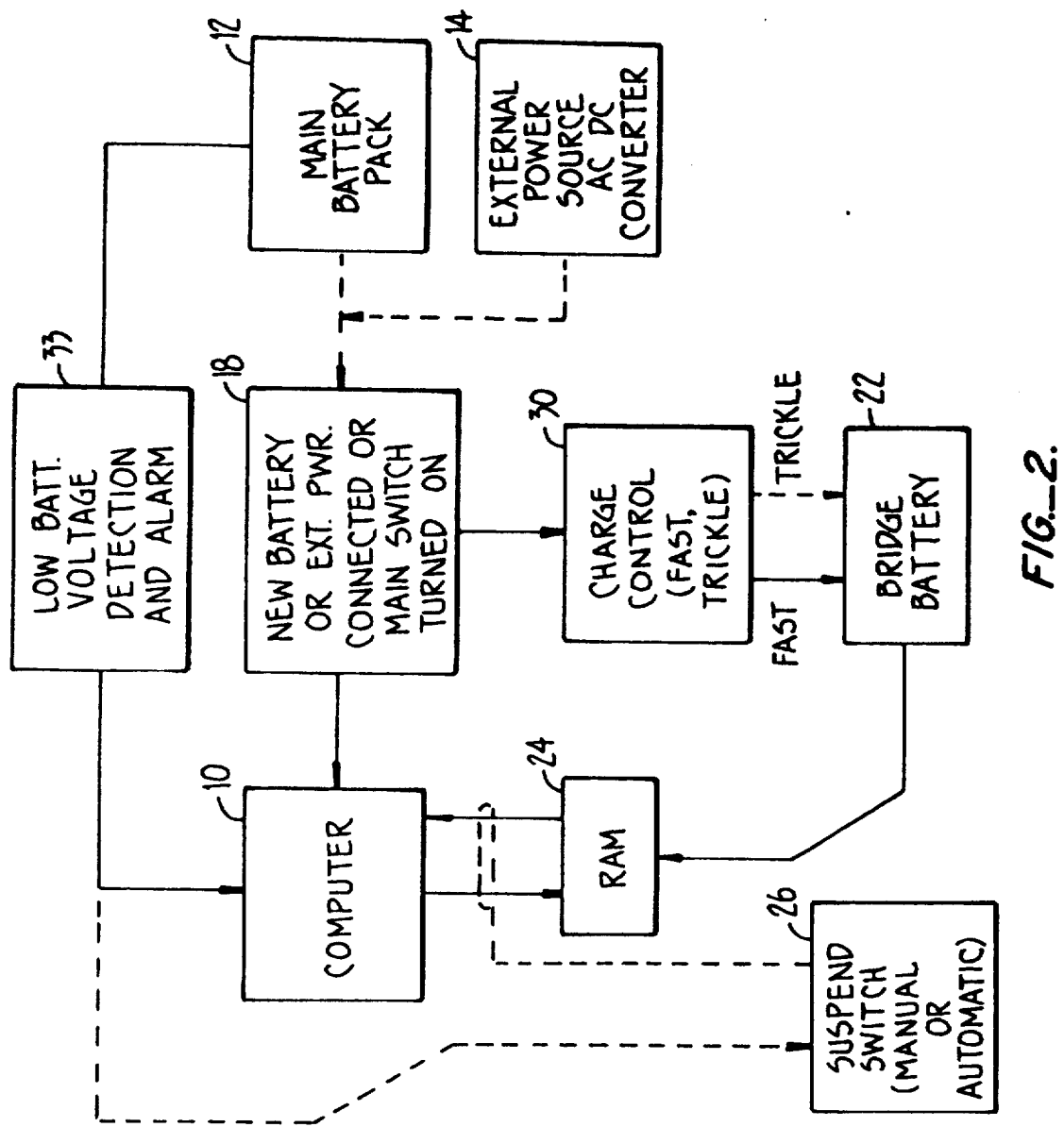
FIG._2.

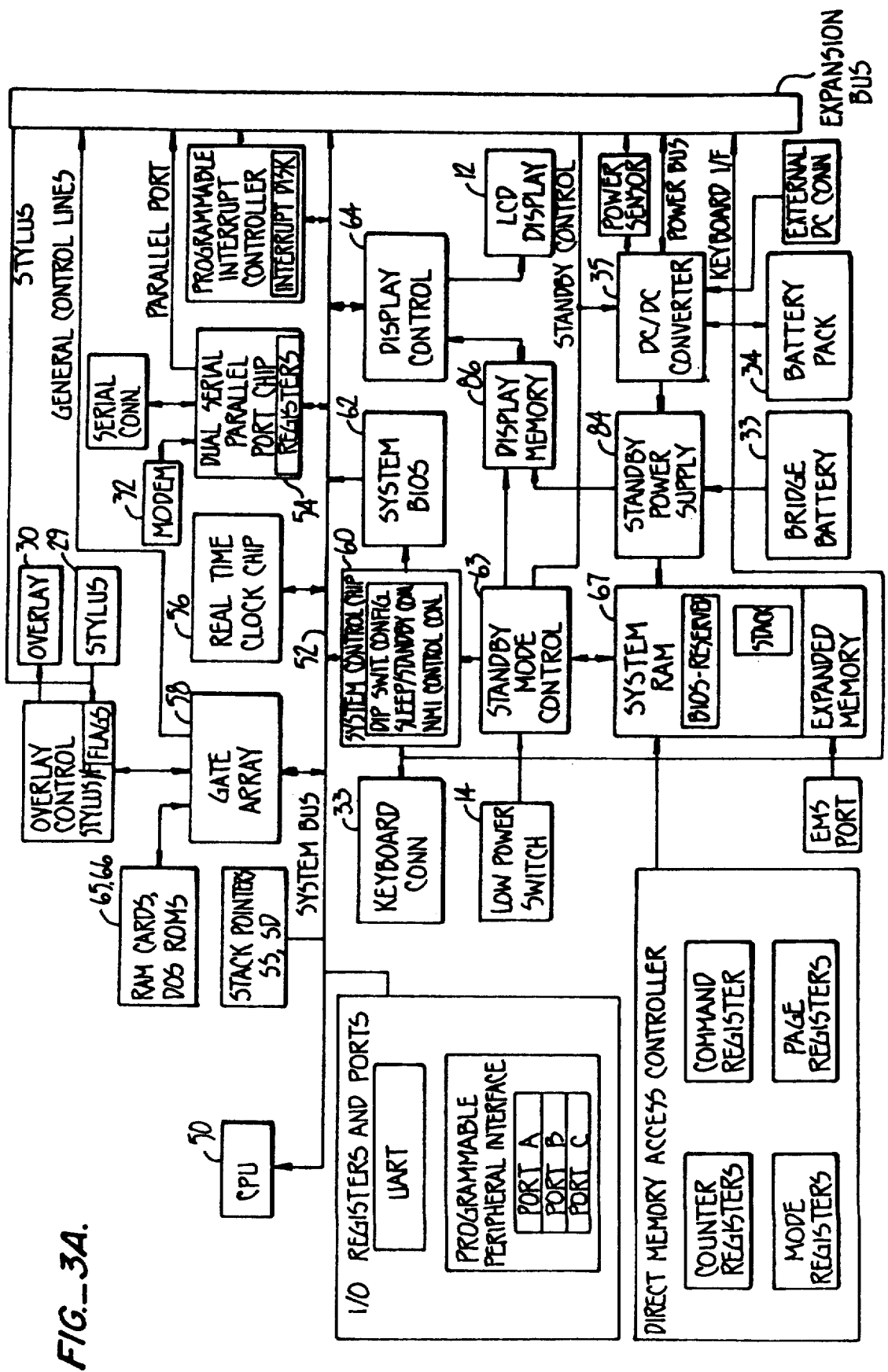
FIG._3A.

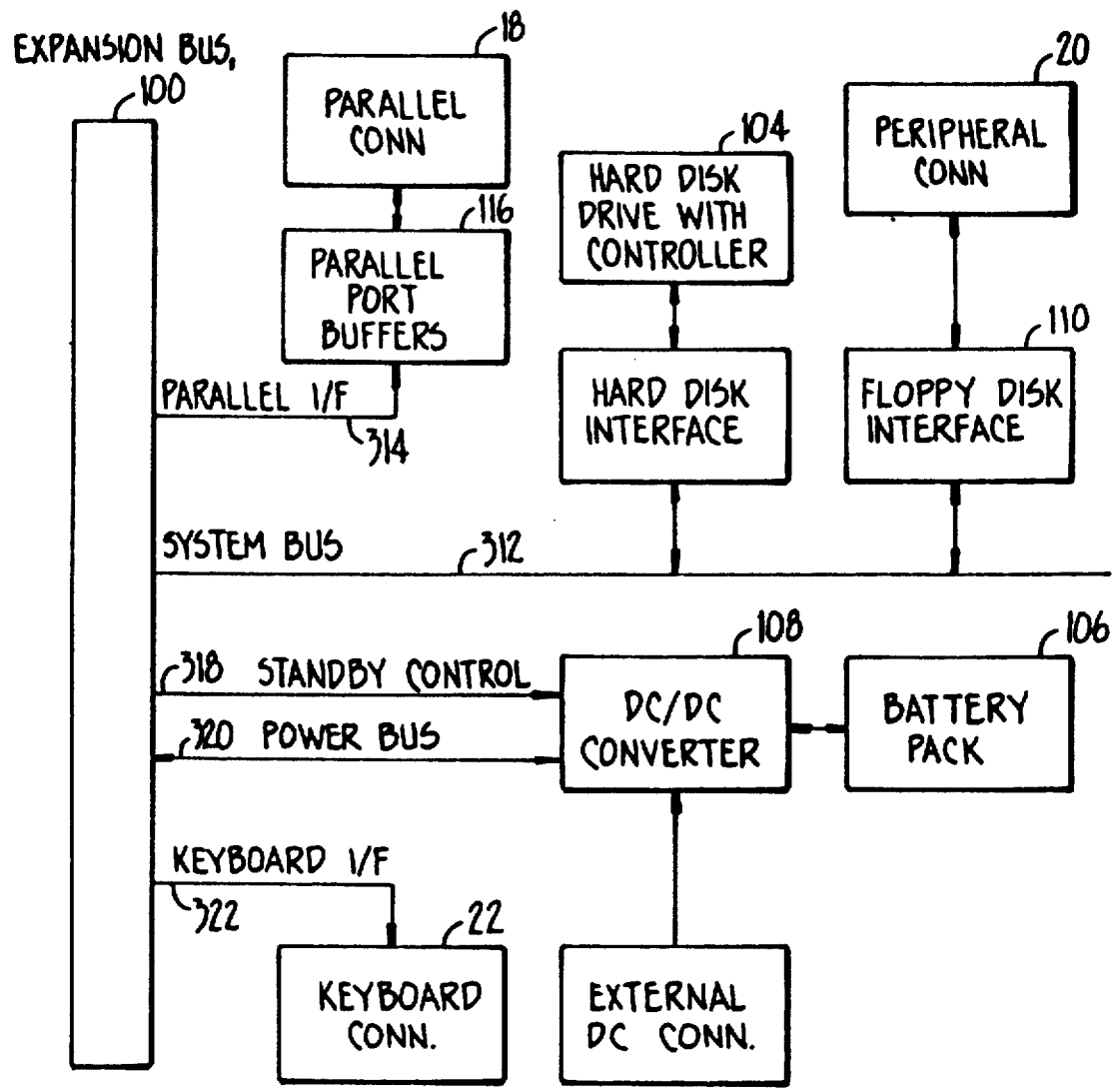
FIG._3B.

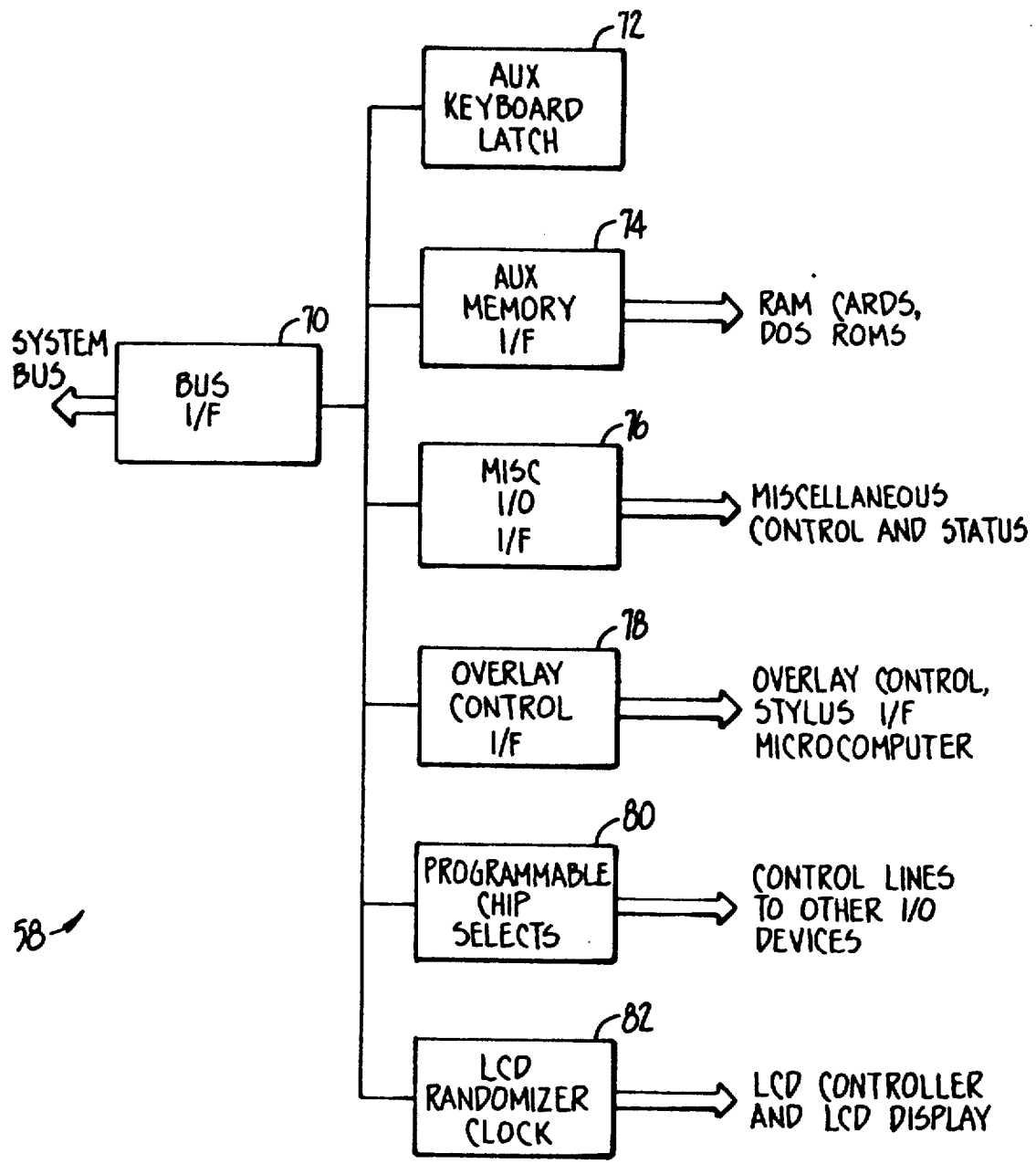
FIG._4.

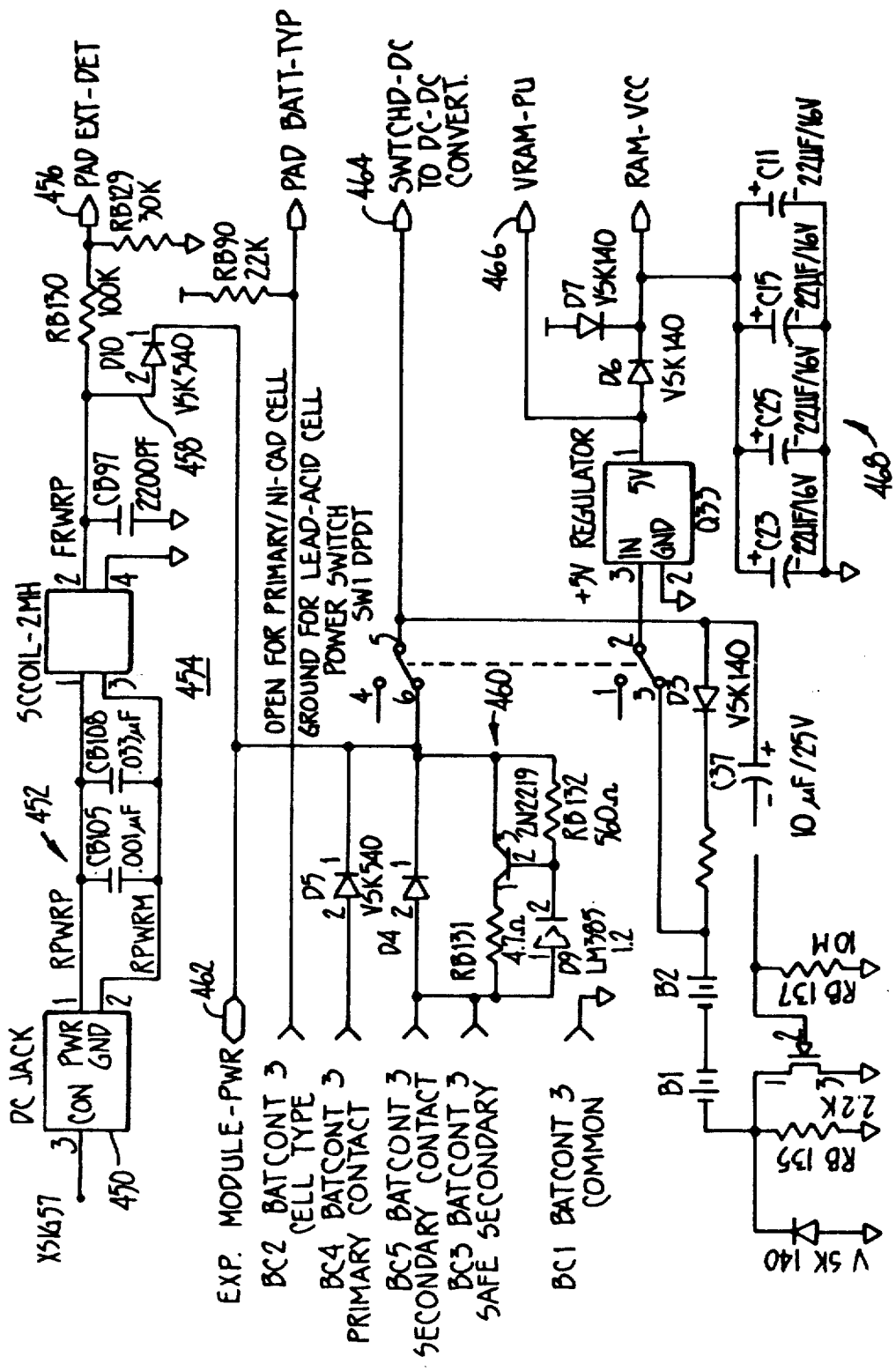
FIG._5.

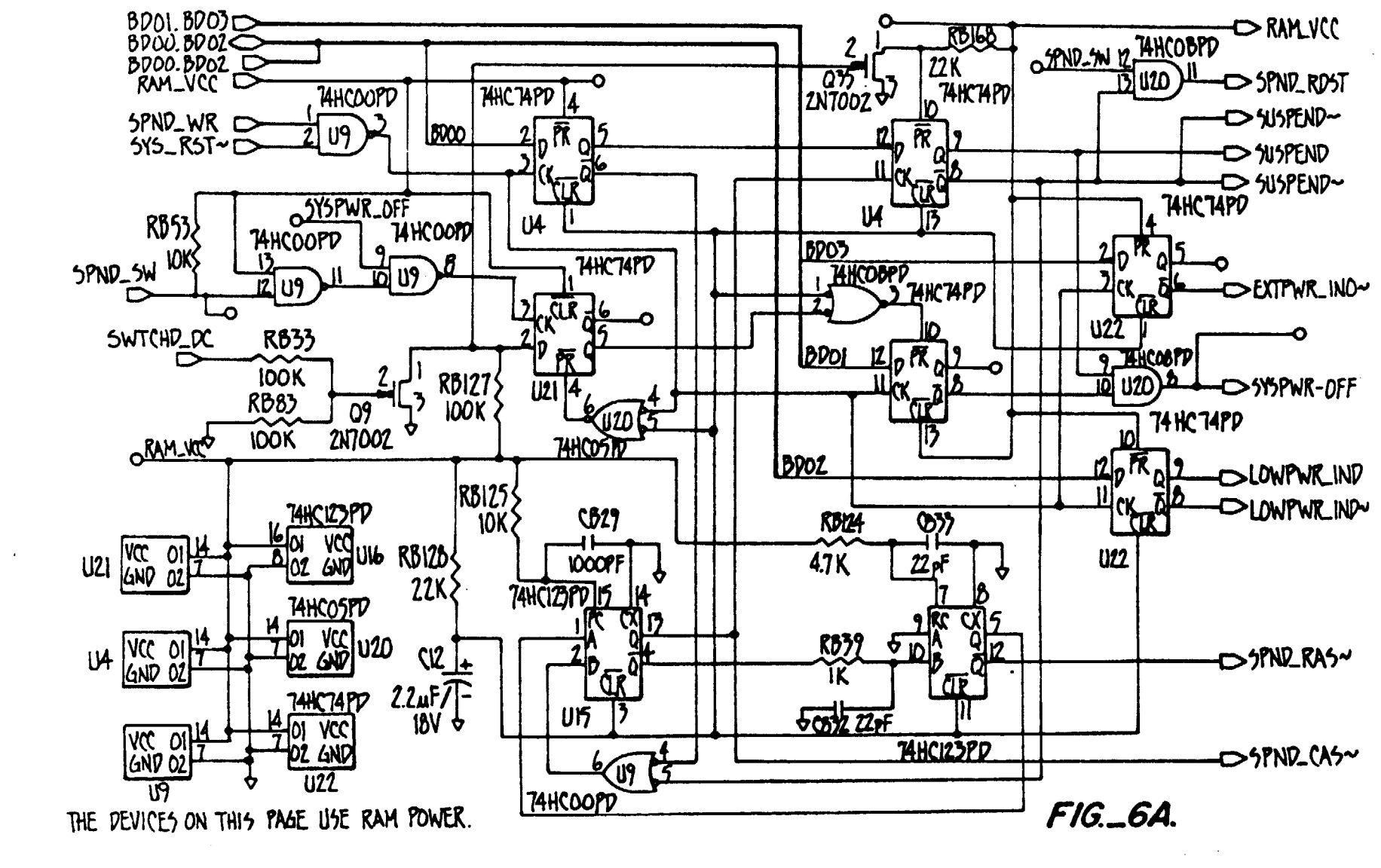

FIG._6A.

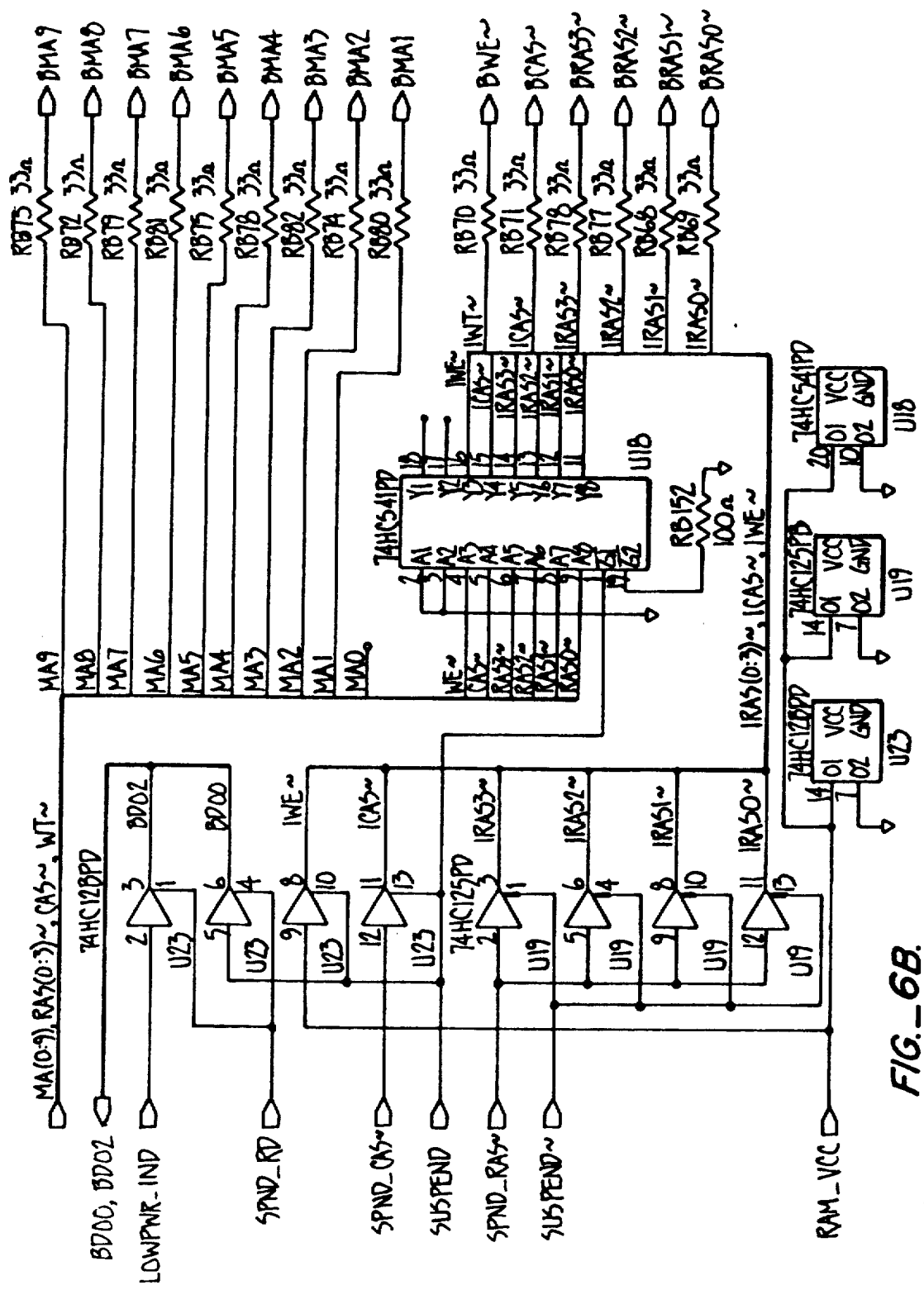
FIG._6B.

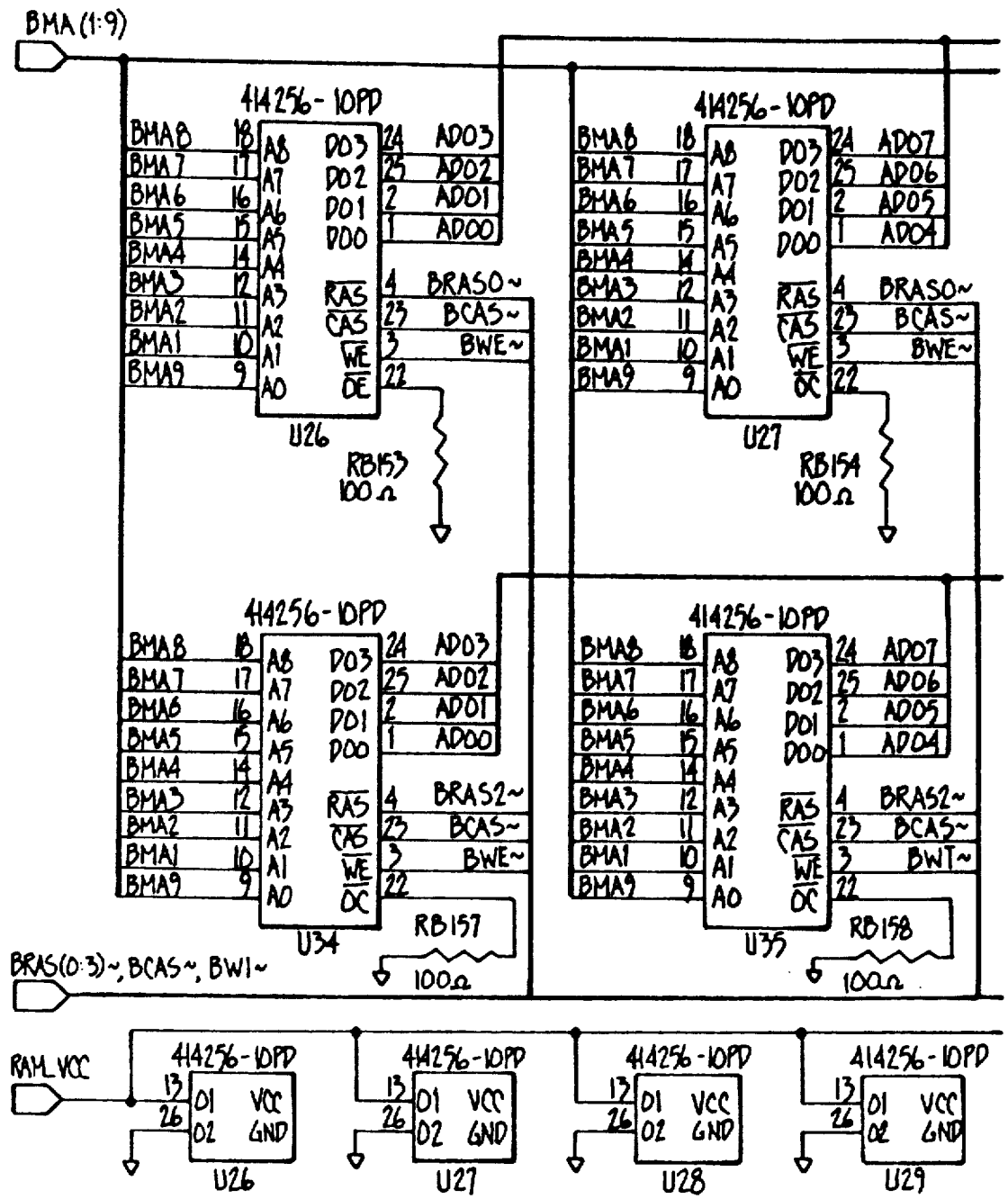
FIG._7A.
FIG. 7A. | FIG. 7B.
FIG._7.

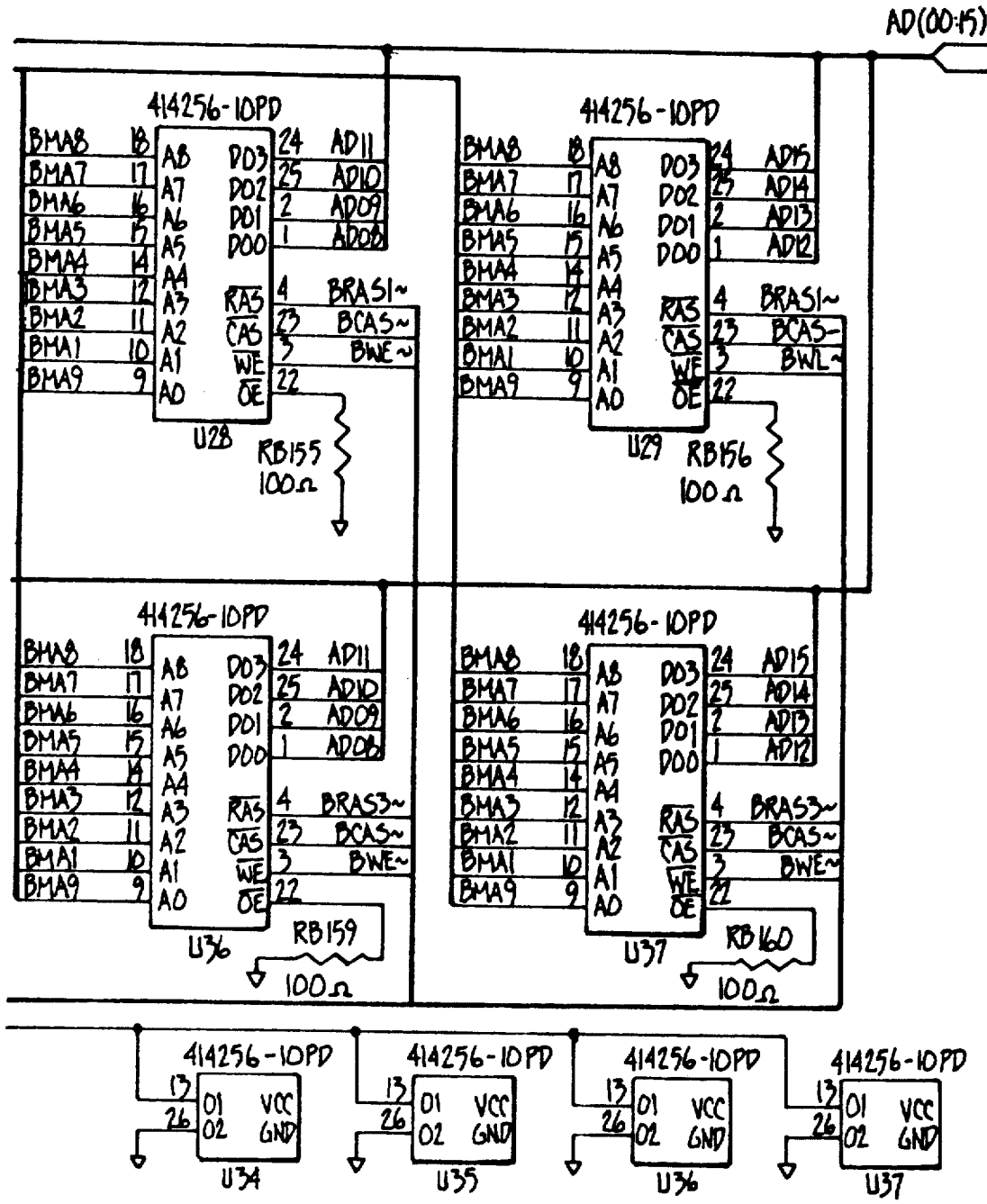
FIG._7B.

LOW-POWER, STANDBY MODE COMPUTER

This is a continuation of application Ser. No. 07/710,611 filed Jun. 5, 1991, Pat. No. 5,163,153, which is a division of Ser. No. 414,203, Sep. 28, 1989 U.S. Pat. No. 5,041,964, which is a continuation-in-part of U.S. patent application Ser. No. 07/365,147, for "Hand-Held Computer," filed on Jun. 12, 1989, U.S. Pat. No. 5,133,076.

NOTICE REGARDING COPYRIGHT OF MATERIAL

Portions of disclosure of this patent document contain material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF THE INVENTION

This invention relates to computers and, in particular, to a method and apparatus for configuring a computer in a low-power, mode.

BACKGROUND OF THE INVENTION

Previous computers have been provided having a capability of suspending the CPU clock for some period of time in order to save power, such as during those periods in which the computer is not being used. This so-called "sleep" mode saves some amount of power. For example, in a device which uses about 2.67 watts of power during normal operation, sleep mode will permit such a unit to use only about 2.02 watts of power. Such sleep mode is sometimes useful in connection with laptop or other battery-powered, or limited power-source, computers.

It would be further useful to reduce power to an even lower level. Of course, power to the computer can simply be turned off for a period. However, in this case, data and instructions which are in dynamic memory will be lost. It is possible to store data and programs in non-dynamic memory, such as static random access memory (SRAM). SRAM also has less stringent voltage requirements than DRAM, which typically must have a regulated 5-volt power supply with little deviation therefrom. This is an additional reason why SRAM is conventionally used as non-volatile memory. However, these memory devices are expensive and, perhaps of more consequence to lap-top applications, require greater volume and have greater mass than corresponding dynamic memories.

SUMMARY OF THE INVENTION

The present invention includes the recognition of the problem, namely that it would be useful to have a lightweight dynamic memory, but that such memory does not store programs and data without a source of power. When power to the computer is discontinued (to save the battery), the contents of such dynamic memory is lost. The present invention includes the recognition that users often wish to have a computer which can enter a low-power mode at some time during the course of a user application and can reenter the full-power mode in such a fashion as to permit the user to continue with his application at the point where he left off. The user wishes to have such a capability so that entering the low-power mode does not result in losing any of the data, information, programming, or other input which have been provided to the application program at the point at which low-power mode was entered.

The present invention includes a workable, practical system which permits preserving the contents of lightweight dynamic memory while the computer is otherwise turned off or powered-down. The invention provides the benefits of two technologies (previously thought to be incompatible): preserving memory during a low-power mode (previously thought to require the use of non-volatile memory, such as SRAM); and the use of relatively small, light-weight dynamic memory.

One aspect of the invention includes the provision of apparatus and devices which can be used to provide power to a DRAM as needed for refreshing the memory therein, even while the remainder of the computer is turned off or in a power-down mode. Another aspect of the invention includes the apparatus and methods by which, before entering a power-down mode, all necessary information is stored in the DRAM or other memory in such a manner that, following entry of the full-power mode, the user can continue with his computer application at the same point at which he left off.

The present invention involves providing a low-power mode, as described, which, for a device consuming about 2.67 watts during full-power use, will consume only about 0.2 watts during the low-power mode. In such a system, a battery which would have approximately a 3-hour useful life (on one charge) will, by the present invention, have a useful life of about 8 hours or longer.

The low-power memory apparatus of the present invention includes a regulated 5-volt power supply and a standby mode control device. This standby mode control device can be used to selectively supply power to the entire system, or only to the system RAM and the standby mode control device, while the remainder of the system receives no power.

The method of entering standby mode, so as to permit later full-power use without loss of data or programs, includes disabling interrupts and direct memory access operations, and, following said steps of disabling, saving I/O indicating registers and ports. The process also includes forcing a refresh of the memory prior to entering standby mode. One aspect of the invention involves determining which items must be saved to memory before entering standby mode, in order to avoid loss of needed information. Because it is contemplated that the low-power mode will be entered during a user application, and since user application might conceivably require all portions of the user-addressable (i.e., applications-addressable) DRAM, the saved items must be saved in an area other than the applications-addressable portion of DRAM. Accordingly, the present invention involves saving such items to portions of the DRAM not normally accessible to the user applications program. In particular, the invention includes saving such items to a portion of DRAM which is reserved for use by the basic input/output system (BIOS). Although a block of DRAM is reserved for use by BIOS, there are certain portions of this block that are typically not fully employed, or which may even be entirely unused by BIOS. It is into these portions that, in the preferred embodiment, the stored items are placed. However, there are only a limited number of these items. It is for this reason that it is not feasible to simply store all items which might conceivably relate to the state of the machine at the time of entering low-power mode. There is not sufficient memory in the unused portion of the BIOS-reserved block to accommodate large amounts of memory storage. Therefore, the present invention involves reducing the number of items which are stored to a point at which the necessary items can be stored in the limited unused portions of the BIOS-reserved block. In the preferred embodiment, all necessary items are stored in fewer than 48 bytes of data.

BRIEF DESCRIPTION OF THE DRAWINGS

FIGS. 1A, 1B, and 1C show a flow-diagram of a method for entering low-power mode according to the present invention;

FIGS. 1D, 1E, and 1F show a flow diagram of a method for exiting from the low-power mode according to the present invention;

FIG. 2 is a simplified schematic view in block-diagram form indicating basic operation of the battery system for a computer of the present invention;

FIG. 3A is a block diagram of the computer according to this invention;

FIG. 3B is a block diagram of the expansion module of this invention;

FIG. 4 is a block diagram of a customized gate array in the present invention;

FIG. 5 is a circuit diagram showing a main power supply of a computer, including the battery charging circuit of FIG. 2;

FIG. 6A is a circuit diagram showing driving of the DRAM clock lines;

FIG. 6B is a circuit diagram showing SPND-RAS and SPND-CAS clock signals for the DRAMS; and FIG. 7, consisting of 7A and 7B, is a circuit diagram showing use of the RAM-VCC in connection with DRAM memory.

DETAILED DESCRIPTION OF THE PREFERRED EMBODIMENT

Figure 8:
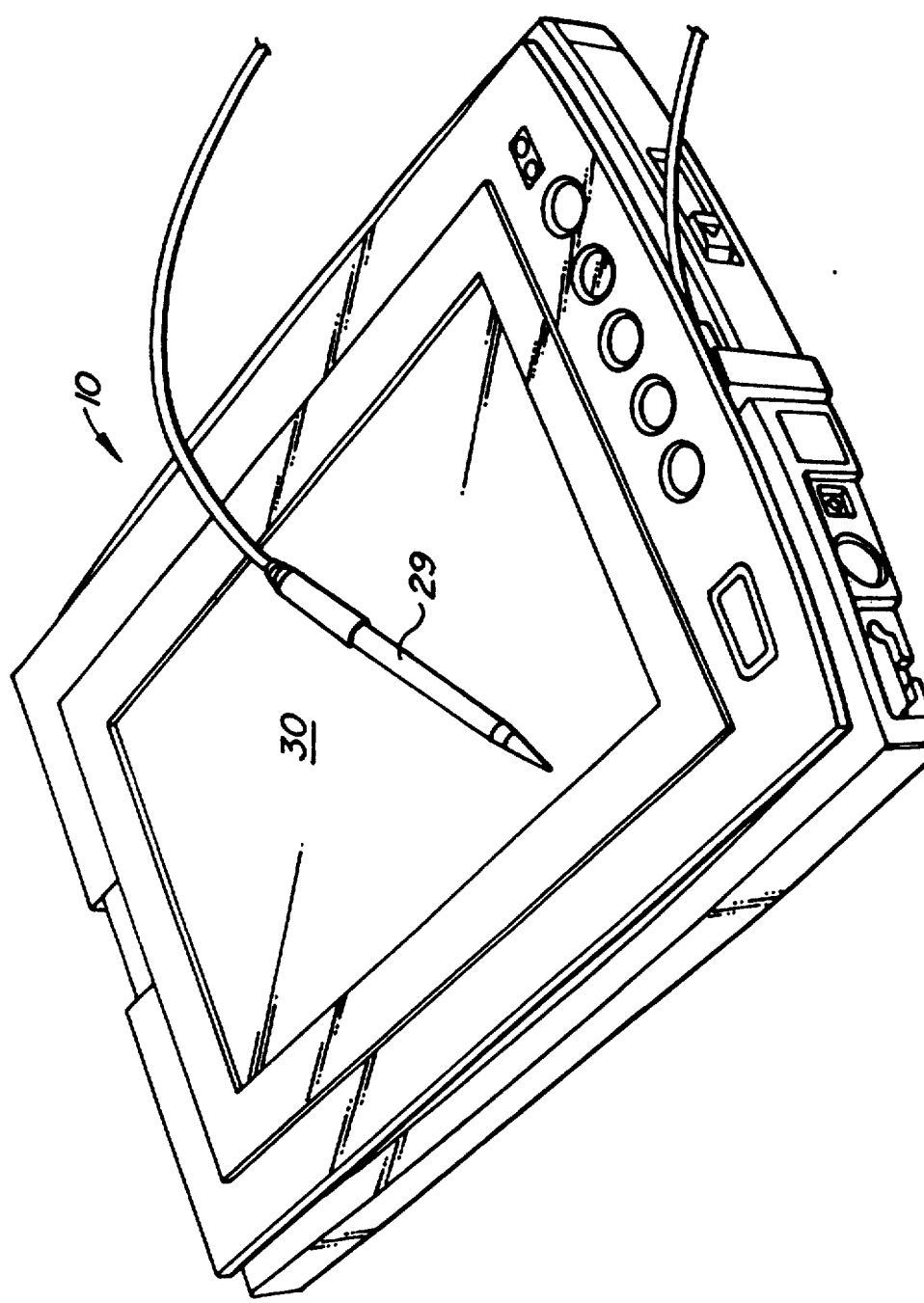
FIG. 8 is a perspective view showing a hand held portable computer in accordance with one embodiment of the present invention.

In the drawings, FIG. 8 shows a hand held computer 10 as an example of a battery powered device which may include a battery compartment. The computer 10 in FIG. 8 is shown constructed generally as disclosed in patent application Ser. No. 365,147 entitled "Handheld Notebook Style Computer", assigned to the same assignee as the present invention, and now being U.S. Pat. No. 5,133,076, issued Jul. 21, 1992.

The portable handheld computer 10 has a display screen 30 supported by screen write software, allowing information to be entered on the screen and into the computer using a pen or stylus 29, as explained in the referenced U.S. Pat. No. 5,133,076.

According to the preferred embodiment, the low-power mode can be entered by one of four routes. As shown in FIG. 1A, the user can initiate the low-power mode by low-power switch 14 (FIG. 3A). Low-power mode can also be initiated when the input devices are idle for more than a predetermined amount of time 16, when the power of the power supply falls before a predetermined voltage level 18, or when a user application specifies that low-power mode is to be entered 20. The idle entry mode 16 is termed "automatic low-power" modes. In any of the last three instances 16, 18, 20, a basic input/output systems (BIOS) routine is called 22, which initiates later portions of the procedure, as shown in FIG. 1A. In the case of a user pressing the low-power switch 12, certain steps 24 are taken which are not needed in connection with the other entry modes 16, 18, 20. In the case of a low-power switch activation 12, such activation results in generation of a non-maskable interrupt (NMI) 26. The NMI causes the flag register, containing flags, such as an overflow flag, parity flat, zero flag, direction flag, and the like, as well as a code segment (CS) register and instruction pointer (IP) register, to be pushed onto the stack 28. At this point, a particular NMI handler, namely the "standby NMI handler," is activated 30. It should be noted at this point that low-power mode is occasionally referred to herein as "standby" or "suspend." This terminology is an artifact of development work. The terminology "suspend" should not be confused with "suspend" as it is used in terms of a particular mode of the 82C100 device (provided by Chips and Technologies of Palo Alto, Calif.) used as the system control chip, referred to below.

The "standby" handler results in disabling the receipt of further NMIs 32. Disabling further NMIs is useful to prevent receipt of an additional NMI while the present NMI is being attended to. This step is particularly useful in the context of the preferred embodiment which, unlike typical computers, makes frequent and active use of NMIs. In a typical previous computer, an NMI is an aberration, usually signifying a catastrophic event which must be dealt with immediately, and thus is not maskable. In the preferred embodiment of the present invention, NMIs are used on a routine basis, and thus can be expected to occur while the NMI standby handler is operating, unless they are disabled.

Following disabling of further NMIs, certain registers are saved to the stack, namely, AX, BX, CX, DX, SI, DI, DP, DS, and ES 34. The source of the NMI is determined 36. The overlay controller chip is read in order to determine which NMI has been generated 38. At this point, control passes, via a jump, to the "NMI-suspend routine" 40. Following the jump to the NMI-suspend routine, further processing is similar for all four entry modes, 12, 16, 18, 20.

There are occasions during which it is useful to prevent the occurrence of low-power mode. One instance in which "low-power" mode might profitably be disabled is when the computer is receiving information over a modem through its serial port. In such an instance, there may not be any recognition that activity is occurring because there are no keyboard entries, and there may be a long period before there is access to a disk drive or RAM card. For this reason, during such an operation, the idle entry mode 16 could possibly be activated. Accordingly, it is desirable to have a method for disabling "low-power" or "automatic low-power" modes. After entering the mainstream of the process 41, it is determined whether one of the two low-power modes is enabled 42. If neither of the possible standby modes is enabled, that particular NMI is cleared 44 and processing returns 46 to the normal instruction stream.

If either the low-power mode or automatic low-power mode is enabled, the programmable interrupt controller (PIC) is dealt with. The first step is to save the PIC interrupt mask (the PIC is typically an Intel 8259 chip or an equivalent chip) 48. The interrupt mask is saved so that it can later be restored when full-power mode is entered, in order for the user to be able to enter his application with the same interrupt priorities and capabilities as when he left his application. Following the saving of the interrupt mask, the PIC is set to disable new interrupts, such as by providing a new interrupt mask which masks all interrupts 50. This is provided in order that no new interrupts will be handled by the PIC during the remainder of the entry into low-power mode. Any interrupts which are currently pending or in progress are then serviced 52.

Following the attention to the PIC, the direct memory access (DMA) procedures are dealt with. The PIC is dealt with before the DMA. The first step in dealing with the DMA is to finish all direct memory access operations which are in progress 54. This is because DMA operations cannot be readily saved in such a way that, upon reentering full-power mode, they can be resumed without loss of data. Accordingly, they are allowed to finish once they have begun. The current DMA mask registers are read 56 and subsequently new DMA operations are disabled 58. New DMA operations can be disabled by, for example, providing the appropriate mask. The DMA chip itself is then disabled 60.

Following attention to the DMA, the stack registers SS and SP (stack segment and stack pointer) are saved in memory 62. These are saved to a portion of memory other than the stack. The stack pointers cannot be saved on the stack since the stack pointers define the stack.

In the preferred embodiment of the present invention, storage that would normally be made (in other computers) to disk is, instead, made to a RAM device which is configured to emulate a disk. Part of the emulation involves the status bits which correspond to bits that would normally be used in connection with a disk drive. One of these bits is the motor status bit. This bit is set to an off configuration 64. The purpose of setting the bit in this manner is so that the RAM cards will be powered-up during their next operation.

A number of I/O state-defining registers and ports are then saved to memory 66. Although these items can be stored in any order with respect to each other, they should be stored following the PIC and DMA operations described above. In the preferred embodiment, certain registers from the DMA chip, namely the counter registers, command registers, mode registers, and page registers, are saved. After these saves, a master clear command is sent to the DMA 68. Next, three ports of the programmable peripheral interface (PPI) chip have their contents stored 70. For the four map registers of the extended memory specification (EMS) device are stored 72. The contents of the universal asynchronous receive/transmit (UART) chip 74 are stored. The registers of the UART which are saved are the byte format, at 2FBh/3FBh; modem control at 2FCh/3FCh; line status at 2FDh/3FDh; modem status at 2FEh/3FEh; interrupt enable at 2F9h/3F9h; divisor (least significant byte) at 2F8h/3F8h, and divisor (most significant byte) at 2F9h/3F9h registers. The contents of the parallel port registers are stored 76, namely, the data latch at 378h and the printer control register at 37Ah. Certain registers of the system controller chip are stored, specifically register 43H, indicating the conditions of the DIP switches, register 4Bh, designating the sleep/memory configuration, register 4Ch, the EMS configuration port register, and register 72h, signifying the NMI control status, are saved 78. The overlay controller FLAGs of the overlay controller chip are saved 80. Following saving of the I/O state 66, the NMI vector feature is disabled. The NMI vector feature is a feature of the 82C100 system controller chip, produced by Chips and Technologies, Inc., of San Jose, Calif., which substitutes certain entry addresses for interrupt handlers. The reason for disabling this feature is that if check-summing is used, the addresses which might otherwise be substituted will be correctly check-summed. Thus, disabling the NMI vector feature 82 is not necessary if no check-summing is to be done.

In the next stage, the sleep mode of the 82C100 is disabled 84. The 82C100 is configured such that, upon execution of a halt or "HLT" command, it will enter one of two modes, a "sleep" mode or a "standby" mode. As noted above, the 82C100 standby mode is not to be confused with the low-power mode being described in the present invention. It is desired to disable the sleep mode so that, as noted below, when the HLT command is entered, the sleep mode will not be entered but, rather, the standby mode will be entered. Next, the standby mode of the 82C100 is enabled 86, for the reasons discussed above.

If check-summing is desired, it is preferably done at this point 88. Preferably, the entire RAM is check-summed if check-summing is to be used. This involves check-summing all conventional RAM (00000h-9FFFFh), video RAM (B8000h-BFFFFh), and EMS RAM. One 16-bit check sum is produced for each of these three portions of memory. If check summing is done, the check sums are stored in battery-backed CMOS, rather than DRAM. In the presently preferred embodiment, check summing takes a time period considered too long (about 5 seconds), and is, therefore, not done. However, check summing can be used as a part of this invention if desired.

Following the check sum, if any, the RAM is forced to undergo a refresh. DRAM must be refreshed with a period between refreshes which does not exceed the manufacturer-specified maximum inter-refresh period. Because a certain amount of time is required to enter low-power mode, and because it is not known at this point how long it has been since the RAM has been refreshed, a RAM refresh is forced at this point. This will help to ensure that the manufacturer-specified inter-refresh period is not exceeded. The RAM refresh is forced 90 by performing 512-word reads at 00000h and at 80000h.

Following the forced refresh 90, the 82C100 is set to disable the normal RAM refresh 92. Immediately thereafter, the 82C100 is set to a "power off" state and "standby mode on" state. These settings are preferably done simultaneously or immediately consecutively 94. Thereafter, an "HLT," or halt instruction, is executed 96, which causes the 82C100 standby mode to be entered.

Operation upon return to the full-power mode is illustrated in FIGS. 1D-1F. In the preferred embodiment, the only mode for entry of the full-power mode is by the user pushing the low-power/full-power button 112. Other modes, such as entry of full power after a predetermined time interval, are possible. Pushing of the button causes power to be applied to the computer. Initially, the computer follows the same steps 116 as if the computer were being powered-up from an off-state, rather than from a low-power state. The first ROM BIOS instruction is executed, normally at address FFFF0H 118. This results in execution of the power-on self-test (POST) code 120. The 82C100 is configured into an initial configuration, and peripheral chips may also be configured at this time. Port 182h is next read 124. Port 182 contains information from which it can be determined whether the computer is exiting from the low-power mode or is being powered-up from an off-state 126. If the computer is not exiting from the low-power mode, it continues the normal POST routine 128, followed by the BOOT routine 130.

If the computer is exiting a low-power mode, it is next determined whether the computer is currently running on AC power 132. If the computer is not running on AC power, the battery voltage is checked. If the battery voltage is below a predetermined voltage $V_1$ 134, the computer is caused to reenter the low-power mode 136, using methods similar to those described above. If the computer is running on AC power, or if the battery voltage is sufficiently high, an attempt is made to clear the 82C100 standby mode 140. Next, it is determined whether such attempt to clear the standby mode was successful 142. If the attempt was not successful, it is not possible to recover the user application and, therefore, normal POST routine processing is continued 128, followed by a BOOT operation 130. If the clearing of the standby mode was successful, operations are undertaken to restore the user application. The normal (system) refresh is enabled 144. Immediately thereafter, a refresh of the memory is forced 146. As noted above, the refresh counter in the system controller chip (used for normal or system operation refresh) is not synchronous with the refresh counters in the DRAM chips (described below), which are used during the low-power mode. Therefore, the system CPU must generate complete refresh counts within the manufacturer-specified minimum refresh time after exiting standby mode, in order to ensure the maintenance of the data within the DRAMs. Typically, the manufacturer-specified minimum refresh period is about 4 milliseconds.

Next, the stack is restored by restoring the stack pointers SS, SP 148. The interrupts are disabled 150 by setting all interrupt mask bits. This is done in order to prevent new interrupts being received before the system is configured to the status of the user application before entry of low-power mode. Next, a number of I/O state defining registers and ports are restored 152. These can be restored in any order. In the preferred embodiment, the DMA controller registers are restored, including the counter registers, command register, mode registers, and page registers 154. The three ports, port A, port B, and port C, of the PPI chip are restored 156. The four map registers of the EMS controller are restored 158. The contents of the UART chip are restored 160. The registers of the parallel port are restored 162. Certain registers of the 82C100 controller chip are restored, namely the register at 43$h$, containing indications of the dip switches, the register at 4$bh$, indicating the sleep/memory configuration, the register at 4Ch, indicating the EMS configuration port, and the register at 72$h$ indicating the NMI control configuration 164. The overlay controller FLAGs are restored, and the battery threshold value is resent to the overlay controller chip 142. The battery threshold value, V2, is the value of battery voltage at which a warning light is lit to indicate a first level of low voltage. The PIC is set to a default state 144. It is not possible to restore the PIC to a saved state because some of the PIC control registers are write-only, and thus cannot be read and saved upon entry of low-power mode. However, the PIC configuration is normally not reset by user applications and, accordingly, since it is always maintained in the same state by configuring a PIC to its default state 144, it will be in the state in which it normally is upon entry of low-power mode.

If the CPU speed has been changed from its default state prior to entry of low-power mode, this fact would be reflected in information stored in battery backed-up CMOS RAM. This information is read from the CMOS RAM to determine the state of the CPU speed when low-power mode was entered 146. If the state was the default or slow state, no action is taken. If the CPU had been changed to the fast speed, the CPU is now reset to fast 148.

The real time clock (RTC) is initialized 150, and the time and date are obtained from the real time clock. The new time and date are set in low memory variables because the BIOS time did not elapse while the computer was in the low-power mode 152.

When the display mode of the computer is changed, this fact is reflected in information stored in the BIOS RAM area. Accordingly, this information is retrieved from BIOS RAM, and the display controller chip is initialized to the state it was in when low-power mode was entered 154. The base addresses and the interrupt levels in the serial/parallel port chip are set 156. The interrupt FLAG is cleared in order to disable interrupts 158. Next, the programmable interrupt controller interrupt mask is restored from memory 160. The user's CPU registers are restored 162. NMIs are reenabled 164. Finally, an IRET command is executed, which results in restoring the FLAGs register, CS and IP, and in returning to the user application 166.

As shown in FIG. 2, a computer 10 is normally connected to a main battery pack 12 or, in the alternative, an external power source 14. Both the main battery pack 12 and the external power source 14 can be removed or can fail. For field use without main battery recharging, the main battery pack 12 has to be replaced with a freshly charged battery pack at certain intervals. A "bridge" battery 22 is shown connected to the computer. This enables the computer 10 to continuing operation without interruption when the battery is changed. In order to charge the bridge battery 22 while the main switch is on (including connection of external power when the battery is low), or if the main switch is turned on while a charged power source is available (as indicated in block 18), a fast charge is applied to the bridge battery for a short period, for example, 3 minutes. A charge control circuit 30 effects the fast charge. FIG. 1 shows the bridge battery 22 supplying temporary power only to RAM 24 of the computer 10. All active programs and data preferably are unloaded to RAM 24, via the manual or automatic low-power switch 26, when the battery needs to be replaced or goes too low to operate the computer.

FIG. 3A is a block diagram of the major components of computer 10. References in FIG. 3A to "standby" mean the low-power mode, rather than the 82C100 standby mode. Internal model 32 is a 2400 baud MNP model manufactured by U.S. Robotics. The optional external keyboard is an IBM XT compatible keyboard.

Computer 10 may receive power from a battery pack 34 or from a standard AC source converted to DC through an external AC/DC converter, such as a 17.25 volt, 1.25 amp unit built by Tamura, attached through an external jack. The computer's battery compartment may be configured as disclosed in copending application Ser. No. 07/364,921, entitled "Battery Compartment," assigned to the same assignee as the present invention and incorporated into this application by reference. Computer 10 has been designed to minimize power requirements, thereby minimizing the size of the battery needed. One example of the power minimization is the use of low-power mode.

Battery pack 34 may be rechargeable as disclosed in copending application Ser. No. 07/364,920, entitled "Externally Rechargeable Battery Pack For A Computer," now U.S. Pat. No. 4,998,055 assigned to the same assignee as the present invention and incorporated into this application by reference. A bridge battery 33 may also be provided for allowing the main computer battery to be removed and replaced without turning off the computer. This bridge battery may be configured as disclosed in copending application Ser. No. 07/364,950, entitled "Computer With Provision For Continued Operation During Battery Change," assigned to the same assignee as the present invention and incorporated into this application by reference. An 8-watt, three output DC/DC converter 35, such as that manufactured by ITT, is used to set the system voltage to the appropriate level.

The computer's internal memory consists of removable RAM cards 65; system ROM 66 (shown schematically); and system RAM 67 (shown schematically). The memory cards 65 contain software specific to the computer's application. Memory cards 65 are preferably Epson IC memory cards with an 8 bit data bus and 40-pin card edge connectors. Each has a small battery associated with it to maintain data for six or more months without drawing on the main unit power. Memory cards 65 may be made in accordance with the disclosure of the copending application Ser. No. 07/364,922, entitled "Memory Card With Removal Tab," assigned to the same assignee as the present invention and incorporated into this application by reference.

The use of memory cards 65 in place of a conventional hard disk drive is another size and weight minimizing feature of this invention. Firmware is provided with computer 10 to cause the memory cards to emulate a disk drive, thereby making computer 10 compatible with conventional PC software without using a heavy and bulky disk drive.

System ROM 66 contains standard system program instructions such as MS-DOS. Preferably, system ROM 66 consists of two 27C010 type, 128 k by 8 bit EPROM's, but mask ROM types may be used instead. The two ROM chips are disposed in EPROM/ROM sockets on the main logic board 28. In the preferred embodiment, system RAM 67 consists of eight 256 K×4 dynamic RAM's.

A microprocessor or CPU chip 50 is connected to the other components via a standard system bus 52. In the preferred embodiment, microprocessor 50 is an OKI MSM80C86A-10RS 16-Bit CMOS microprocessor. Also connected along system bus 52 are a dual serial/parallel port chip 54; a real time clock chip 56; a customized gate array 58; a system control chip 60; a customized system BIOS 62; and a display controller 64.

In the preferred embodiment, serial/parallel port chip 54 is a Chips and Technologies 82C605 CHIPSport multifunction controller. Real time clock chip 56 is a Dallas Semiconductor DS1287A chip. Preferably, system control chip 60 is a Chips and Technologies 82C100 Super XT system controller, and display controller 64 is a Yamaha PCDC V6366 Panel and CRT display controller. System control chip 60 provides all the core logic required to implement an XT compatible system board, including: a system block; bus controller; DMA controller; interrupt controller; timer; parallel peripheral interface; keyboard interface; memory interface; input/output channel interface; extended memory system; power management control; clock switching logic; input/output channel timing control; and clock conversion logic.

The purpose of gate array 58 is to reduce the chip count and to provide an efficient bus interface for the specialized input/output devices with which computer 10 is used. Gate array 58 uses the control signals, address and data bits provided by the system core logic to allow access to the internal control registers of gate array 58 as well as to the peripherals to which it is attached. Gate array 58 is addressed through input/output ports on system bus 52, though the peripherals may be addressed as memory.

A block diagram of the customized gate array chip 58 is shown in FIG. 4. A standard bus interface and internal decode block 70 communicates with system bus 52. Connected to interface 70 are an auxiliary keyboard block 72; an auxiliary memory interface block 74; a miscellaneous input/output interface block 76; an overlay processor interface block 78; a programmable chip select block 80; and an LCD randomizer clock block 82.

Auxiliary keyboard block 72 provides a standard 8-bit latch as is known in the art. It connects to the hardware pertaining to the keyboard emulation program as explained below.

Auxiliary memory interface block 74 provides buffers and control ports to allow access to removable storage cards 65 and non-removable system ROM 66. Interface 74 is a paged interface with a 64 k page size and a data bus 8 bits wide. Only one of the four devices (i.e., the two RAM cards and the two ROM's) may be accessed at a time. To select a device, the program sets the appropriate bit in the Auxiliary Memory Select Port. A Status Port is provided to allow determination of storage card type and presence. A Page Register Port is used to select the active 64 k byte page in the selected device.

The miscellaneous input/output block 76 provides eight general purpose input pins and eight general purpose output pins. Block 78 provides an 8-bit buffer for bidirectional data transfer between two processors and interrupt/data available status bits in both directions. The processors utilize this resource through a simple protocol.

The programmable chip select block 80 provides 10 pins that can be used as input/output or memory decodes. The LCD randomizer clock block 82 provides a pseudo-random AC signal to the LCD. The logic in this block divides the clock from the LCD controller 64 by 68 and changes its phase every 289 clocks.

System BIOS 62 consists of two EPROM's. It is a standard IBM-compatible Input/Output System that has been modified to include program steps for three key systems: (1) the computer's disk drive simulation; (2) the computer's low-power mode; and (3) the computer's keyboard emulation system.

The use of memory cards 65 in place of a disk drive saves space in, and reduces the weight of, computer 10. In addition, the RAM memory cards are faster than a disk drive and are more durable since they have no moving parts. The two MS-DOS ROM's 66 are concatenated by the BIOS 52 into one virtual disk device. Thus, the system emulates three floppy disk drives.

The low-power mode may be started in one of four ways: (1) by pressing a standby key on the face of the computer; (2) by opening the bus connector door on the bottom of the computer housing; (3) by system timeout, i.e., by leaving the computer inactive for a preselected period of time; or (4) by the detection of low battery voltage by the overlay control interface block 78 of the gate array 58. Any one of these four events triggers an interrupt signal in the CPU 50. The CPU 50 then disables all other interrupts. After waiting for all pending input/output operations to finish, the CPU saves the system state in system RAM 67.

The CPU reads the lower 512 words of both banks of the system memory to insure the refresh count. The CPU then disables the system RAM refresh, sets the standby refresh on, and turns the main power off. A standby power supply (element 84 in FIG. 3A) maintains voltage to system RAM 67 and display RAM 86.

Standby mode may be exited only by activating the standby switch on the face of the computer 10. When the main power supply returns, the CPU tests a standby status indicator. If the CPU detects that the system was in standby mode, the CPU shuts off the standby mode refresh and restarts the system refresh. The CPU reads 512 words of both system RAM banks to insure refresh. The CPU restores the system state as read from the system RAM, enables interrupts, and returns to the process it was executing prior to entering the standby sequence.

FIG. 5 shows main PC board power supply circuitry for a computer 10. Starting from the top of the circuit diagram of FIG. 6, a DC input jack 50 leads through noise-filtering circuitry 52 and a common mode transformer 54 to an ORing diode D10. A detector 56 detects when an external power source is connected at 50, as opposed to a battery.

A line 58 leads down to the main power circuitry, which is diode ORed in with the batteries—primarily cells (e.g., alkaline battery cells) at BC4 or NiCad battery cells at BC5. The diode ORing is accomplished by diodes D10, D5, and D4, and it ORs all three power sources, i.e., primary cells, NiCad cells, and the external source. The circuit will always use the external source, through the diode Oring, when the external source is connected, since it is a higher voltage source than either type of battery.

A circuit 60, shown in FIG. 6, and comprising Q27, R8132, D9, and RB 131, shunts D4. This is the circuit for charging the battery if it happens to be the NiCad rechargeable battery. The contacts BC1-BC5 are in a battery compartment which may be configured in accordance with the disclosure of copending application Ser. No. 07/364,921, entitled "Battery Compartment," now U.S. Pat. No. 5,015,546 assigned to the same assignee as the present invention and incorporated herein by reference.

The main power switch SW1 is a double pole, double throw (DPDT) switch. When the main switch is closed, it connects the battery or external power (or power from a connected expansion module, indicated at 62 in FIG. 6) to a location 64, labeled "SWTCHD DC" in FIG. 6. This goes out toward a DC-to-DC converter, 60 which creates the voltages needed for running the machine.

As indicated, the main power switch SW1 also switches power into the bridge battery circuit 30, and connects the bridge battery circuit 30 with a 5-volt regulator labeled "Q33." To the right of the regulator Q33 is another diode ORing situation at D6 and D7. The line into D7 receives power from the converter fed by 64, and this system voltage is ORed in by D6 and D7. The regulator Q33 will not operate until the system is put in the low-power mode, and the main battery 13 is removed, in which case the DC-to-DC converter is shut down and the bridge battery 22 takes over operation of the RAM (see RAM VCC) through the regulator Q33. Only the RAM is supplied through the bridge battery 22 and the regulator Q33.

Thus, D6 and D7 provide another ORing circuit between a plug 5-volt source from the DC-to-DC converter and the 5-volt regulator Q33, which is supplied by the bridge battery 22. The auxiliary regulator at Q33 is fed by the bridge battery only if the power switch is closed and the main battery and external power sources are missing.

The low-power mode, which may be generated by a switch or automatically, as mentioned above, is read by software. The software goes about shutting down the DC-to-DC converter and taking all of he critical parameters out of the machine. It takes the program memory being run, and the machine status, and stores then in the main RAM. When this is completed, the software shuts down the DC-to-DC converter. Following this, the main battery, if installed, or otherwise the bridge battery, keeps the main RAM alive. When the bridge battery is being discharged while powering the memory, the diode VSK 140 comes into play to provide the current path from Q33 to ground.

When the operator engages the low-power mode switch again, all of the programs, previous video displays, etc. are restored. All of the parameters are restored throughout all of the hardware after the power supply has been brought up again by insertion of a new battery, connection of an external source, etc.

FIG. 6 also indicates that an item 66, identified as "VRAM PU," may be powered by the main battery or the bridge battery during the low-power mode. This is to put the video memory chip into a low-power mode.

Power distributing capacitors 68, shown in the lower right of FIG. 3, reduce noise on the RAM VCC line. These do not absorb any power, but have the purpose of providing a low-impedance source or reservoir of stored power.

FIGS. 6A and 6B depict schematically the circuitry for providing power to the RAM during low-power mode. The RAM devices themselves are depicted in FIG. 7, and are indicated as the chips U26, U27, U29, U34, U36, U37. The items which are powered during low-power mode include the above-mentioned DRAM chips and the ICs in FIGS. 6 and 7, labeled "U4, U9, U16, and U18-U22." U4 is used to synchronize, at the CPU cycle level, the entry and exit of the DRAM from standby mode. U22 is used to drive LED status indicators that can remain lit during low-power mode. U21 is used to maintain the logic signal (SYSPWR-OFF) that turns off the main system DC/DC converter while the system is in low-power mode. U9 and U20 are used to implement the combinitorial logic required to complete the low-power control function 63.

Using the circuitry shown in FIGS. 6A and 6B, the DRAM clock lines IWE, ICAS, IRAS0-IRAS3 are driven from two sources. In normal system operation, U18 is enabled and the clock lines come from the system control chip 60. In low-power mode, U18 is disabled and U19 and U23 are enabled, allowing the SPND-RAS the SPND-CAS to clock the DRAMs. IWE is forced high to prevent write cycles to the DRAM in low-power mode. U16 is a dual mono-stable multivibrator chip which is configured to produce an oscillator at the proper frequency to generate the SPND-RAS and SPND-CAS clocks for the DRAMs. The DRAM cycle timing is designed to produce a CAS before RAS refresh cycle. In this type of cycle, the DRAMs provide the refresh address count internally, so that the external logic does not need to provide the address counter that other types of refresh cycles require.

The method of entering standby mode and the method of exiting standby mode are summarized in the following Tables I and II.

TABLE I

1. User presses standby button, which generates a Non-Maskable Interrupt (NMI).
2. 8086 pushes the FLAGs, CS, and IP registers on the stack and vectors to the standby NMI handler.
3. The NMI handler disables further NMIs and saves the other CPU registers (AX, BX, CX, DX, SI, DI, BP, DS, ES) on the stack.
4. The NMI handler determines the source of the NMI; the standby NMI is generated by the overlay controller.
5. Another routine determines which overlay controller NMI has been generated by reading a data byte from the overlay controller chip.
6. Control passes to the routine that enters standby mode, NMISuspend (standby mode was originally called "suspend mode," and the attached listing reflects this).
7. NOTE: Standby mode can also be entered programmatically, by either the ROM BIOS itself or by an application. The BIOS enters standby mode when the computer has been idle for a user-specified period time (automatic standby mode), or when the computer has been running on a low battery for too long. An application can call a BIOS routine to enter standby mode. In any of these cases, control comes directly to this point; no NMI is generated, and the overlay controller is not involved.
8. NMISuspend determines whether standby mode or automatic-standby mode is enabled by reading a byte stored in battery-backed CMOS RAM. If standby mode and automatic standby mode are both disabled, the NMI is cleared, and control returns to the code that was executing when the standby button was pressed. If either standby mode or automatic standby mode is enabled, the NMISuspend continues to execute.
9. The Programmable Interrupt Controller (PIC, an 8259 equivalent) interrupt mask is saved, then the PIC is programmed to disable any new interrupts.
10. Allow the CPU to service any pending interrupts. The PIC has an in-service register which indicates any interrupts that are being serviced.
11. Allow the CPU to finish any Direct Memory Access (DMA) operations in progress.
12. Read the current DMA Mask Registers, then mask (disable) all new DMA Operations. Disable the DMA chip.
13. Save the SS and SP registers (Stack Segment and Stack Pointer) in memory. These cannot be saved on the stack, since they define the stack.
14. Set the RAM cards' motor status bits all to OFF, so the RAM cards will be powered up during their next operations.
15. Save the Input/Output state of the computer:
  a) 8237 DMA chip
    1) Save the DMA counter registers
    2) Save the DMA command register
    3) Save the DMA mode registers
    4) Save the DMA page registers
    5) Send a Master Clear command to the DMA chip
  b) 8255 Programmable Peripheral Interface chip
    1) Save PPI port A
    2) Save PPI port B
    3) Save PPI port C
  c) Expanded Memory Specification ports
    1) Save the four EMS map registers
  d) 8250 Universal Asynchronous Receiver Transmitter (UART) chips
    1) Save register 2FBh/3FBh, byte format
    2) Save register 2FCh/3FCh, modem control
    3) Save register 2FDh/3FDh, line status
    4) Save register 2FEh/3FEh, modem status
    5) Save register 2F9h/3F9h, interrupt enable
    6) Save register 2F8h/3F8h, LSB divisor
    7) Save register 2F9h/3F9h, MSB divisor
  e) Parallel port registers
    1) Save register 378h, data latch
    2) Save register 37Ah, printer control
  f) 82C100 Super XT Controller chip
    1) Save register 43h, DIP switches
    2) Save register 4Bh, Sleep/Memory configuration
    3) Save register 72H, NMI control
    4) Save register 4Ch, EMS configuration port register
  g) Overlay controller chip
    1) Save the overlay controller flags
16. Disable the substitute NMI vector feature of the 82C100 so that addresses 00008h-0000Bh are checksummed correctly. RAM was originally checksummed to ensure that it was not corrupted, but this safety feature took too long (~5 seconds), and was removed.
17. Disable sleep mode, and enable standby mode. Sleep mode must be disabled so that an HLT instruction causes the 82C100 to enter standby mode, not sleep mode.
18. If checksumming RAM (which is not done in the preferred embodiment), checksum all of conventional RAM (00000h-9FFFFh), video RAM (B8000h-BFFFFh), and EMS RAM. Store these checksums in battery-backed CMOS.
19. Read 512 words at 00000h and 512 word at 80000h to cause another refresh of RAM. This ensures that the RAM will not lose data between the time the 82C100 refresh is disabled, and the time standby mode is entered and the 82C100 begins to refresh RAM again.
20. Disable the 82C100 RAM refresh.
21. Turn 82C100 power off and standby mode on.
22. Execute an HLT instruction; this causes standby mode to be entered.

TABLE II

1. With the system in standby mode, the user presses the standby button. This causes power to be applied to the computer. The CPU executes the instruction at FFFF0h, which is the first ROM BIOS instruction.
2. The ROM BIOS executes its normal Power-On Self-Test (POST) code. This code configures the 82C100 chip, as well as many of the peripheral chips.
3. The ROM BIOS determines that the computer is exiting standby mode by reading port 182h. If the computer is not exiting standby mode, the normal POST continues.
4. If the computer is exiting standby mode, the BIOS checks to see if the computer is running on AC power. If so, the BIOS proceeds. If the computer is running on battery, the battery voltage is tested. If it is too low, the computer reenters standby mode. If it is high enough, the BIOS proceeds.
5. Clear standby mode, so the 82C100 can refresh RAM. If standby mode cannot be cleared, proceed with a normal POST and boot.
6. Enable RAM refresh.
7. Read 512 words at 00000h and 512 words at 80000h to cause a refresh of RAM.
8. Restore the user's stack (SS and SP registers).
9. Set all interrupt mask bits to disable all interrupts.
10. Restore the Input/Output state of the computer:
    a) 8237 DMA chip
        1) Restore the DMA counter registers
        2) Restore the DMA command register
        3) Restore the DMA mode registers
        4) Restore the DMA page registers
    b) 8255 Programmable Peripheral Interface chip
        1) Restore PPI port A
        2) Restore PPI port B
        3) Restore LPP port C
    c) Expanded Memory Specification ports
        1) Restore the four EMS map registers
    d) 8250 Universal Asynchronous Receiver Transmitter (UART) chips
        1) Restore register 2F9h/3F9h MSB divisor
        2) Restore register 2F8h/3F8h LSB divisor
        3) Restore register 2F9h/3F9h interrupt enable
        4) Restore register 2FEh/3FEh modem status
        5) Restore register 2FDh/3FDh line status
        6) Restore register 2FCh/3FCh modem control
        7) Restore register 2FBh/3FBh byte format
    e) Parallel port registers
        1) Restore 37Ah printer control
        2) Restroe 378h data latch
    f) 82C100 Super XT Controller chip
        1) Restore register 43h, DIP switches
        2) Restore register 4Bh, Sleep/Memory configuration
        3) Restore register 72h, NMI control
    g) Overlay controller chip
        1) Restore the overlay controller flags
        2) Resend the battery threshold value
11. Program the 8259 PIC to a default state, since some of its control registers are write-only and cannot be saved.
12. Set the CPU speed to fast if that was its state when standby was entered; otherwise, leave the CPU speed set to slow.
13. Initialize the Real-Time Clock (RTC) chip.
14. The low-memory variables for time and date have not changed since standby was entered, so the time and date are incorrect. Get the time and date from the RTC and set the low-memory variables.
15. Reinitialize the Yamaha display controller chip to the state it was in when standby was entered.
16. Configure the 82C605 serial/parallel port chip to set the base addresses and interrupt levels for the serial and parallel ports.
17. Restore the 82C100 Super XT Controller chip.
    a) Restore register 43h, DIP switches
    b) Restore register 4Bh, Sleep/Memory configuration
    c) Restore register 72h, NMI control
    d) Restore register 4Ch, GMS configuration port register
18. Restore the overlay controller chip
    a) Restore the overlay controller flags
    b) Resend the battery threshold value
19. Clear the interrupt flag to disable interrupts.
20. Restore the PIC interrupt mask.
21. Restore the user's CPU registers.
22. Re-enable NMIs.
23. Return to the user's application via an IRET instruction; this restores the user's FLAGS register.

While this description has been made with reference to the preferred embodiment, modifications may be made, as is known in the art, without departing from the scope of the invention as defined by the claims below.

The following is a computer listing of programs usable in connection with the present invention.

What is claimed is:

1. Apparatus for preserving contents of a refreshable dynamic memory in a data processor having a CPU, a programmable interrupt controller coupled to said CPU, a direct memory access controller, I-O state indicating registers coupled to said CPU, I-O ports coupled to said CPU, a dynamic random access memory coupled to said direct memory access controller and to said CPU, and a system controller chip having an unclocked sleep mode and unpowered standby mode, the apparatus comprising;
    a first power system for powering said CPU and said controller chip and for powering said memory during refreshing of said memory;
    said data processor being configured to disable acceptance of later interrupts by said programmable interrupt controller in response to issuance of a command to enter low-power mode;
    said data processor having a CPU being configured to disable the direct memory access controller at a time following disabling of acceptance of later interrupts by said programmable interrupt controller;
    said data processor having a CPU being configured to save to said memory, the contents of at least some of said I-O state indicating registers and I-O ports, in response to said disabling of said direct memory access controllers;
    said data processor having a CPU being configured to execute an instruction for initiating said standby mode of said system control chip at a time following said saving to said memory;
    said dynamic random access memory being configured to refresh said memory, using said power system, during a period following said step of saving to said memory, to substantially preserve the contents of said memory; and
    wherein said data processor substantially discontinues powering of said CPU and said controller chip by said first power system to define a period of low power consumption.

2. A portable, handheld computer comprising:
    a display screen overlay configured to receive handwritten user input data;
    a data processor, having a CPU, coupled to said display screen overlay, for processing data in accordance with at least a first application program;
    a random access memory in communication with said data processor having a CPU;

a power supply coupled to said data processor having a CPU and to said data screen overlay said power means being switchable between a high power mode wherein said power means supplies power at a high level and a low power mode wherein said power means supplies power at a low level;

said data processor having a CPU being configured to store at least first data in said memory and to supply power at said low power mode at a first time during execution of said application program;

a user-activatable switch for entering high power mode; and said data processor having a CPU being configured to retrieve said first data and to configure said power means in said high power mode in response to user-activation of said user-activatable switch, wherein execution of said application program is continued from the configuration said application program was in at said first time, substantially without loss of input, information, or programming which was input to the application program prior to said first time.

* * * * *